(No Model.)
J. D. BRUNTON.
APPARATUS FOR DRESSING STONE.
No. 342,861. Patented June 1, 1886.
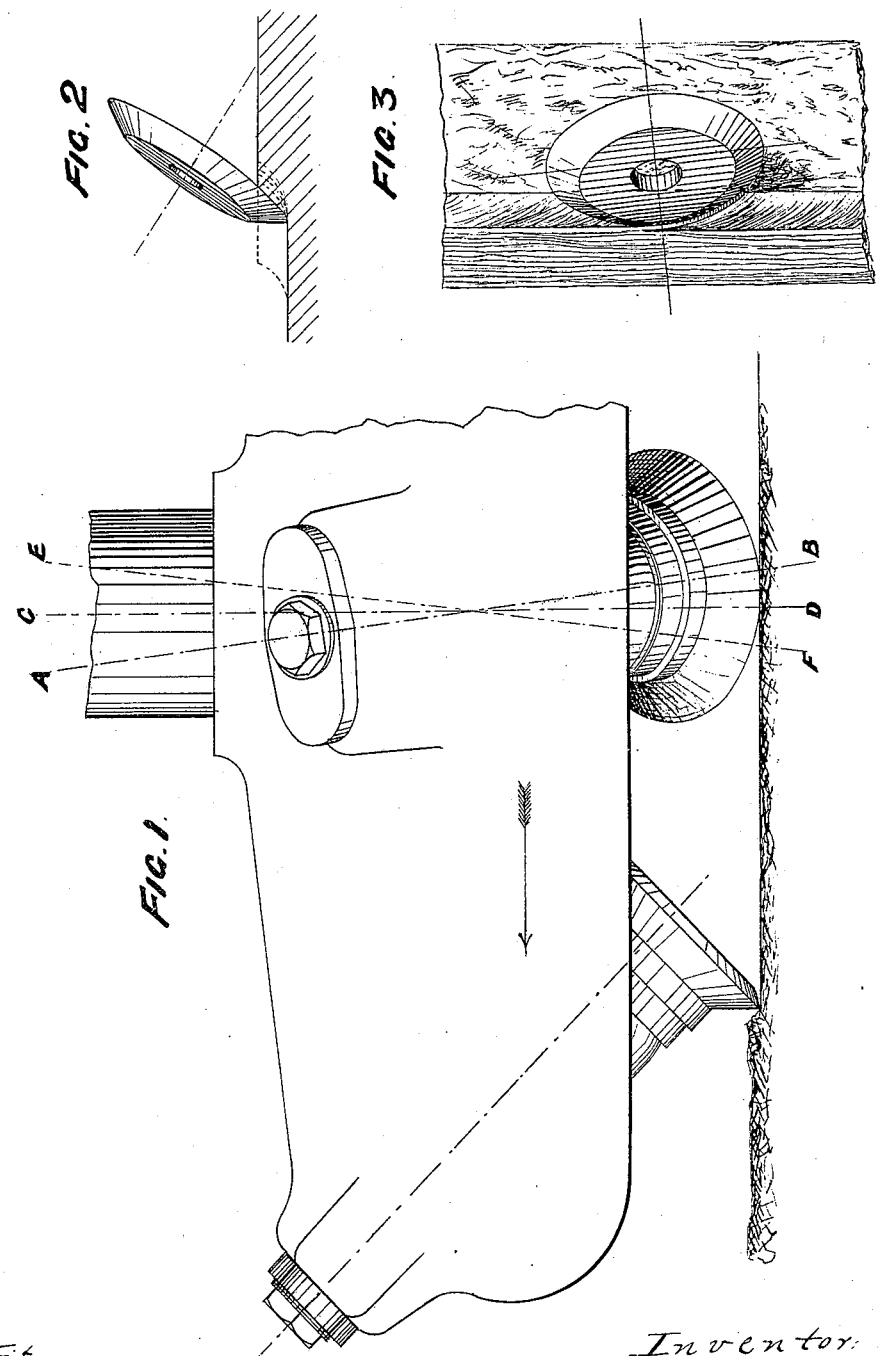
Witnesses:
Inventor:
John D. Brunton
by Marcellus Bailey
his attorney

United States Patent Office.

JOHN DICKINSON BRUNTON, OF WESTMINSTER, COUNTY OF MIDDLESEX, ENGLAND.

APPARATUS FOR DRESSING STONE.

SPECIFICATION forming part of Letters Patent No. 342,861, dated June 1, 1886.

Application filed April 14, 1882. Serial No. 58,289. (No model.) Patented in England February 1, 1882, No. 505.

*To all whom it may concern:*

Be it known that I, JOHN DICKINSON BRUNTON, a subject of the Queen of Great Britain, and residing at 19 Great George Street, Westminster, in the county of Middlesex, England, have invented certain Improvements in Apparatus for Dressing, Turning, and Molding Stone and the Like,(for which I have obtained a patent in Great Britain, No. 505, dated February, 1, 1882,) and of which the folowing is a specification.

My invention relates to an improvement in the appplication of a circular cutter or circular cutters for planing, shaping, or turning stone and the like; and my said invention consists in giving a skew to the axis of the cutter-spindle, by virtue of which the advancing edge more readily acts on the stone, either by splitting off the portion to be removed or by paring or slicing away that portion. In this latter case, according as a greater or less skew to the plane of motion is given to the cutter or cutters, the surface or surfaces formed by the edge of the cutter or cutters will be more or less concave; also the angle of the chord of the concavity to the resultant adjacent (which may be called the "dressed") surface of the stone may also be varied to suit the requirements of different classes of work by varying the inclination of the cutter or cutters. Where the production of a concave surface by the last-mentioned action of the cutter or cutters is the particular object in view, the skew of the cutter or cutters is increased to any extent that may be necessary and is within practical limits.

In the drawings, Figure 1 represents in side elevation a portion of a revolving chuck which carries positively-rotated cutters, in accordance with my former patent, No. 184,330, to which cutters my present invention is applied to act by splitting off the portion to be removed. Figs. 2 and 3 are diagrammatic representations, which will be hereinafter referred to.

A B is the center line or axis of the cutter-spindle, or may be regarded as the plane in which the spindle-axis lies, and is skewed or inclined to the plane C D, in which lies the chuck-axis. It may be inclined to the right, as shown, in which case the chuck will revolve in the direction indicated by the arrow, or it may be inclined to the left, as at E F, in which case the chuck will revolve in the contrary direction.

Figs. 2 and 3 are plan and side views of a cutter alone having this skew, illustrating its mode of operation in dressing a stone by the before-mentioned slicing or paring action.

I am aware that cutter-spindles have been connected with a main spindle with their axes at an angle to said main spindle, and I do not claim such construction, broadly.

I claim—

1. In the herein-described stone-cutting apparatus, the combination, with the main spindle and the cutter-spindle, of the chuck secured directly to the main spindle, and having a bearing for the cutter-spindle formed in the body of the chuck in a plane other than the plane of the main spindle, whereby the cutter-spindle is supported firmly in a position askew to the main spindle, substantially as set forth.

2. In the herein-described stone-cutting apparatus, the combination of the main spindle, the chuck, the cutter-spindle mounted in said chuck in a plane other than the plane of the main spindle, and devices, substantially as described, for imparting a positive rotation to the cutter-spindle, as set forth.

In testimony whereof I have signed my name to this specification in the presence of two subscribing witnesses.

JOHN DICKINSON BRUNTON.

Witnesses:
    W. I. WEEKS,
        31 *Lombard Street, London.*
    JOHN JAMES,
        47 *Lincoln's Inn Fields, London.*